United States Patent [19]
Bryant

[11] 3,832,910
[45] Sept. 3, 1974

[54] TELESCOPIC BELT TIGHTENER

[76] Inventor: Charles Brate Bryant, Rt. 1, Box 150, Wildwood Point Rd., Hartland, Wis. 53029

[22] Filed: June 15, 1972

[21] Appl. No.: 263,337

[52] U.S. Cl. .......................................... 74/242.14 R
[51] Int. Cl. ................................................ F16h 7/10
[58] Field of Search ............ 74/242.14 R, 242.13 A, 74/242.12

[56] References Cited
UNITED STATES PATENTS
3,105,982  10/1963  Yost et al. ................. 74/242.14 R X
3,118,315  1/1964  Loosli ............................ 74/242.12

Primary Examiner—Leonard H. Gerin
Attorney, Agent, or Firm—Henry C. Fuller, Jr.

[57] ABSTRACT

A belt tightener includes an outer tube fixed to mounting brackets and an inner tube telescoped in the outer tube with one end of the inner tube having a plate which is connectable to a bearing block for the shaft which supports the endless belt. A key welded to the inside of the outer tube and extending longitudinally thereof is received in a keyway in the inside tube to prevent relative rotation between the tubes. An adjusting bolt extends into the inner and outer tubes and is threadably received by a nut welded to the other end of the inside tube.

5 Claims, 4 Drawing Figures

PATENTED SEP 3 1974　　　　　　　　　　　　　　　3,832,910
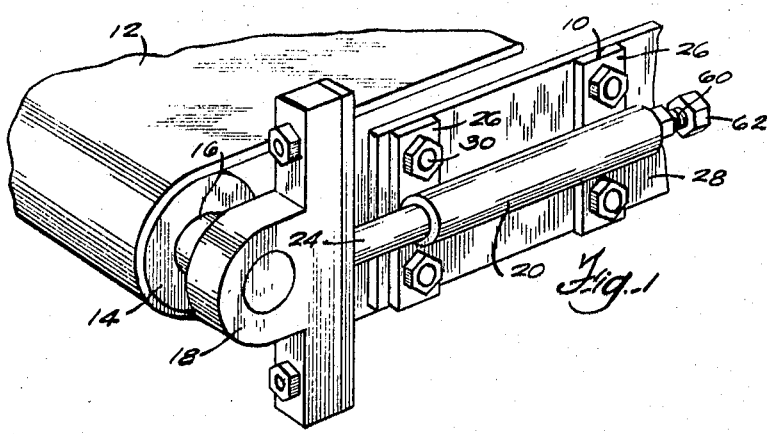
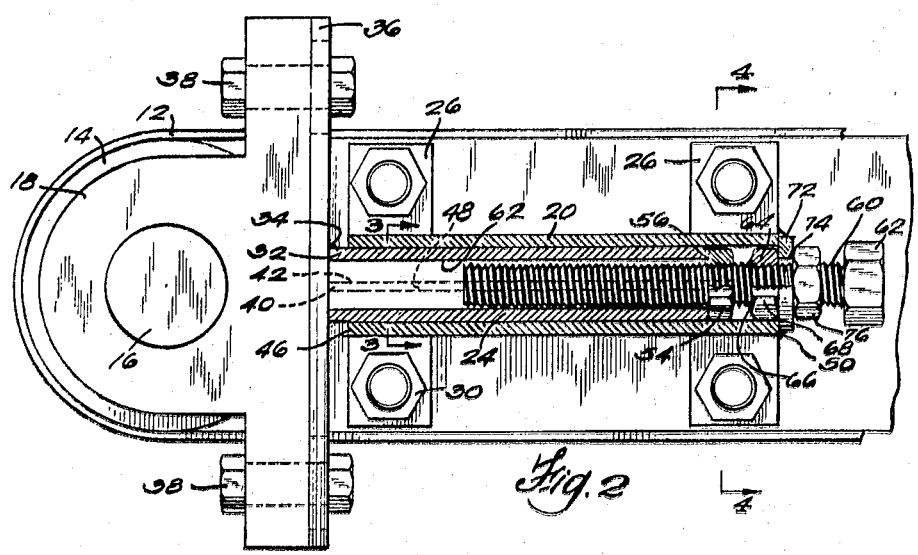
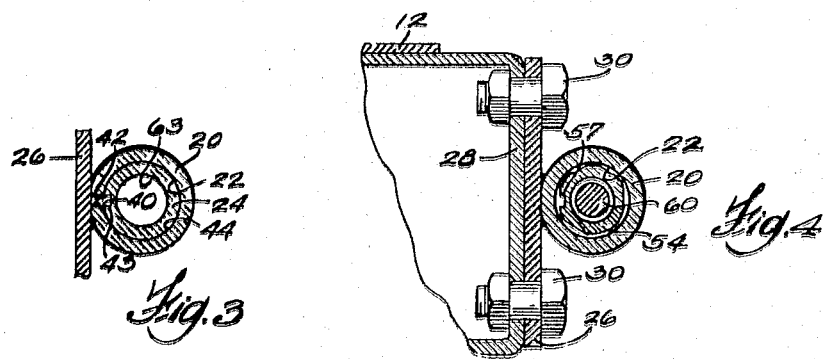

3,832,910

TELESCOPIC BELT TIGHTENER

SUMMARY OF INVENTION

The invention provides a belt tightener in which an inner tube telescopically received in an outer tube has a nut welded to one end. A key fixed to and projecting from a slot in the outer tube is received in a keyway in the inside tube and nut. An end plate welded to the end of the outer tube provides an abutment for a stop nut welded to an adjusting bolt. The end plate also provides a tightening surface for a lock nut located outside of the end plate.

DESCRIPTION OF DRAWINGS

FIG. 1 is a side and end perspective view of a belt tightener embodying the invention.

FIG. 2 is an enlarged elevational view in fragmentary section and with parts broken away of the belt tightener shown in FIG. 1.

FIG. 3 is a sectional view along line 3—3 of FIG. 2.

FIG. 4 is a sectional view along line 4—4 of FIG. 2.

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the drawings, FIG. 1 discloses a belt tightener 10 for adjusting tension of an endless belt 12 which is supported on a roller or pulley 14 having a shaft 16 journaled in a bearing block 18. The belt tightener 10 includes a first tube or outer tube 20 having a hollow interior or bore 22 which telescopically receives a second tube or inside tube 24. The outer tube 20 is fixed to one or more mounting brackets 26. The brackets 26 are fastened to the frame 28 by fasteners 30.

The outer end 32 of the inside tube 24 is welded at 34 to a mounting plate 36 which is connected by bolts 38 to the bearing block 18.

Relative rotation between the inner and outer tubes 20 and 24 is prevented by a key 40 which is received in and welded in a slot 42 in the inside wall 44 of the outer tube 20. The key 40 projects radially from the inside wall and extends longitudinally of the outside tube 20 from the end 46 of the outside tube to a point 48 spaced from the end 46 of the outside tube (FIG. 2). The key 40 is received in a keyway 43 in the outside surface of the inside tube 24.

To move the inside tube 24 axially with respect to the outer tube 20 to vary the position of the bearing block and adjust the belt tension, the device includes a nut 54 welded to the end 56 of the inside tube. The corners of the nut 54 can be rounded in a lathe to fit in the outer tube 20. The nut 54 also includes a keyway 57 in axial alignment with the keyway 43. An adjustment bolt 60 is threaded into the nut 54 and extends within the interior 63 of the inside tube 24. The bolt 60 has a head 62 for manipulation with a wrench.

The belt tightening device 10 also includes a stop member or nut 64 which is welded at 66 to the bolt 60. The nut 64 can be turned in a lathe to provide a concentric exterior surface 68 which is snugly received in the inside wall 49 of the outer tube 20.

An end plate 72 is provided with an aperture 74 for receiving the bolt 60. The end plate 72 is welded to the end 59 of the outer tube 20. In addition to serving as an abutment to limit travel of the bolt when engaged by the stop 64, the end plate also provides an abutment for a lock nut 76, which is threaded on the bolt 60 and located exteriorly of the end plate 72. The end plate is welded to the tube end 50 after the stop nut 64 is positioned in the outer tube 20.

Although in the disclosed construction, the key 40 is welded to the outer tube 20, the key 40 can be welded to the inside tube 24 and a keyway provided in the outer tube 20 if the outer wall has a sufficient thickness to provide the desired strength and rigidity.

What is claimed is:

1. A belt tightener comprising a first tube having a mounting bracket fixed to said first tube, a second tube telescoped in the interior of said first tube, means for connecting one end of said second tube to shaft supporting means, a member having a threaded aperture fixed to the other end of said second tube, a key fixed to one of said first tube and said second tube and extending longitudinally of said tubes, a keyway in the other of said first and second tubes for receiving said key, a bolt threadably received in said member having a threaded aperture for adjusting the axial position of said second tube with respect to said first tube.

2. A belt tightener in accordance with claim 1 including an end plate on said first tube, said end plate having an aperture receiving said bolt and a stop fixed to said bolt and said stop being movable axially with said bolt inside first tube, said stop being engageable with said end plate to limit travel of said bolt.

3. A belt tightener in accordance with claim 2 including a lock nut on said bolt exteriorly of said first tube and engageable with said end plate.

4. A belt tightener in accordance with claim 1 wherein said first tube has an axial slot on the inside surface, with a portion of said key located within said slot and fixed to said first tube and a portion of said key projecting radially from said inside surface of said first tube, and a keyway in the outside surface of said second tube receiving said key and preventing relative rotation of said tubes.

5. A belt tightener in accordance with claim 4 including a keyway in said member having a threaded aperture, said keyway being in alignment with said keyway in said second tube.

* * * * *